United States Patent [19]

Day et al.

[11] Patent Number: 4,581,126

[45] Date of Patent: Apr. 8, 1986

[54] CATALYST SUPPORTS AND HYDROCARBON CONVERSION PROCESSES EMPLOYING CATALYSTS BASED ON THESE SUPPORTS

[75] Inventors: Michael A. Day; Alistair Reid, both of Cleveland, England

[73] Assignee: Imperial Chemical Industries PLC, London, England

[21] Appl. No.: 717,685

[22] Filed: Mar. 29, 1985

Related U.S. Application Data

[62] Division of Ser. No. 574,244, Jan. 26, 1984, Pat. No. 4,526,885.

[30] Foreign Application Priority Data

Feb. 9, 1983 [GB] United Kingdom ................. 8303574

[51] Int. Cl.[4] ............................................. C10G 35/06
[52] U.S. Cl. .................................. 208/138; 208/112; 208/216 PP; 585/260; 585/419; 585/660; 585/751
[58] Field of Search ........................................ 208/138

[56] References Cited

U.S. PATENT DOCUMENTS 4,197,187  4/1980  Day et al. ........................... 208/139

Primary Examiner—Curtis R. Davis
Attorney, Agent, or Firm—Cushman, Darby & Cushman

[57] ABSTRACT

A catalyst support comprises a porous gel of an inorganic substance, for example a refractory inorganic oxide, and has a surface area in the range 125 to 150 $m^2/g$, a mean pore diameter in the range 140 to 190 Å with at least 80% of the pore volume contained in pores having a pore size range of 50 to 90 Å. The invention also relates to catalysts based on such supports and to hydrocarbon conversion processes, for example reforming, carried out in the presence of hydrogen and employing said catalysts.

8 Claims, No Drawings

CATALYST SUPPORTS AND HYDROCARBON CONVERSION PROCESSES EMPLOYING CATALYSTS BASED ON THESE SUPPORTS

CROSS REFERENCE TO RELATED APPLICATIONS

This application is a division of our earlier application, Ser. No. 574,244 filed Jan. 26, 1984, now U.S. Pat. No. 4,526,885.

The present invention relates to catalyst supports and to hydrocarbon conversion in the presence of hydrogen, in particular to the reforming of hydrocarbon feedstocks to produce aromatic hydrocarbons, employing catalysts based on said supports.

Hydrocarbon conversion processes are well-known and widely used. Examples of such processes are the reforming of hydrocarbon feedstocks to increase their content of aromatic hydrocarbons and to increase their value as motor gasoline blending feedstocks, isomerisation processes, cracking processes, hydrogenation and dehydrogenation processes. Many of these processes employ catalysts which may comprise one or more metals or metal compounds either on a support or unsupported.

The choice of catalyst is one factor in influencing the technical economic and commercial success of hydrocarbon conversion processes. The catalyst influences not only the rate of conversion but also the range and relative amounts of the various products obtained from any particular feedstock. In addition, it is very desirable that the catalyst should be so formulated that it enjoys a long life. Many proposals have been made for improving the performance of hydrocarbon conversion catalysts including, for example, the use of specific metals or metal compounds for particular conversions and the use of two or more metals on a catalyst support.

In our U.K. Pat. No. 2,023,640B we describe and claim a process for converting a hydrocarbon feedstock by contacting the hydrocarbon feedstock in the presence of hydrogen and at hydrocarbon conversion conditions with a catalyst comprising a metal supported on a porous gel of an inorganic substance, the gel having been prepared by a method which comprises dispersing solid primary particles of the inorganic substance in a liquid to form a sol containing colloidal particles which are aggregates of the primary particles, drying the sol to produce a porous gel and calcining the porous gel.

The porous gel support of the catalyst for use in the process of our U.K. Pat. No. 2,023,640B is preferably a calcined porous gel of one or more refractory, inorganic oxides, for example alumina, silica, titania, zirconia and is formed by a 'sol-gel' process. Sol-gel processes are described in a paper by Fletcher and Hardy in Chemistry and Industry, 12 Jan. 1968, page 48 and involve the formation of a concentrated sol of the inorganic oxide followed by removal of water, for example by drying on a tray, by solvent extraction, by spray drying or by oil gelation to form the gel. For use as the catalyst support in said process the porous gel can be formed from sols containing more than one substance. Thus, the sol may contain an additive, for example a compound of yttrium, for example yttria. We found that an alumina support prepared by a sol-gel technique and containing small amounts of yttrium was particularly suitable for use as a support for hydrocarbon reforming catalysts. The amount of yttrium present in the catalyst was preferably less than 4% by weight (of the total support) and it was convenient to add the yttrium at the sol preparation stage, for example in the form of a compound of yttrium, for example the nitrate, which during preparation of the gel is converted to yttria.

Suitable methods of preparation of the porous gel support by a sol-gel technique are described in German Patent Application No. 2,647,701. In preparing such a gel it is preferred that the solid primary particles are substantially spherical and of similar size, non-aggregated and non-hydrated prior to mixing with the liquid used, for example water. The primary particles are preferably between 4 and 50 nm in diameter and are preferably prepared by a vapour phase condensation method, as defined in said German Patent Application. By "vapour phase condensation method" is meant a method which involves a vapour phase intermediate. Examples of vapour phase condensation methods are hydrolysis of volatile halides or alkoxides (e.g. flame hydrolysis of, for example volatile metal halides), evaporation and condensation methods using electron beam, D.C. arc or RF plasma heating, and metal oxidation (e.g. magnesium) to give a smoke which is then condensed. A particularly suitable method is flame hydrolysis of a halide, for example aluminium chloride, to give the corresponding refractory oxide. The particles formed by flame hydrolysis are then dispersed in a liquid, for example water, to form a sol containing colloidal particles which are aggregates of the particles. The sol is then dried, for example by tray drying in air, spray drying, oil gelation or by use of a solvent, and calcined in order to improve the strength of the gel and/or modify its sorptive properties.

We also found that it was advantageous in operation of the process of U.K. Pat. No. 2,023,640B if the sol-gel catalyst support possessed pores with a narrow pore size distribution, for example such that 70% of the total pore volume was contained within pores having a size within the range ±25% of the mean pore size.

We have surprisingly found that hydrocarbon conversion processes of the type described in our U.K. Pat. No. 2,023,640B can be further improved by using modified catalysts of the type described in that patent.

In one aspect the present invention comprises a catalyst support which is a porous gel of an inorganic substance, the porous gel having been prepared by a "sol-gel" process, and in which the gel has a surface area in the range 125 to 150 m$^2$/g, a mean pore diameter in the range 140 to 190 Å with at least 80% of the pore volume contained in pores having a pore diameter range of 50 to 90 Å.

Preferably the surface area of the gel support is in the range 130 to 145 m$^2$/g, more preferably in the range 130 to 140 m$^2$/g.

Preferably the mean pore diameter of the gel support lies in the range 155 to 185 Å and the distribution of pore diameters is such that at least 80% of the pore volume is derived from pores having a pore diameter range of 60 to 80 Å.

Preferably at least 80% of the total surface area of the gel support is in pores whose diameter is in the range 110 to 210 Å.

Preferably the inorganic substance forming the support is a porous gel of one or more refractory inorganic oxides, for example alumina, silica, titania, zirconia.

The support of the present invention may be prepared by a sol-gel technique as described in German Patent Application No. 2,647,701. The preferred method for preparing the oxide particles used in the sol is a flame hydrolysis method.

Optionally, the support of this invention may be prepared by intimately mixing two or more sizes of particles of the inorganic substance(s). For example, in a two-component mixture one component might comprise relatively large particles of relatively low surface area and the other component comprise relatively smaller particles of rather greater surface area. This method gives the operator greater flexibility in tailoring the support to his particular needs. The mixture obtained is then made into a sol, converted to a gel and finally calcined at elevated temperature. In this method it is preferred that the particles of both (or all) sizes are substantially spherical. The particles of each component of the two- (or more) component mixture are preferably prepared by a vapour phase condensation method, as defined in German Patent Application No. 2,647,701, flame hydrolysis of a halide being the most preferred method.

A further aspect of the present invention comprises a catalyst comprising a support as hereinbefore defined and a catalytic amount of at least one catalytic metal or compound thereof. Those skilled in the catalyst art will appreciate that a wide range of metals might be incorporated in the support. For example, for hydrocarbon reforming purposes it is preferred that the metal used is a Group VIII metal, more preferably platinum, either alone or with one or more additional metals, for example rhenium or iridium. Optionally the reforming catalyst may also contain a small amount, for example in the range 0.3 to 1.5% by weight of a halide, for example a chloride. Suitably, the reforming catalyst may also contain a small amount of yttrium, suitably present as yttria, for example 0.01 to 1% yttria (calculated as yttrium).

The metal component of the catalyst may be added to the porous gel support by any of the usual methods used to prepare supported metal catalysts. The metal component of the catalyst maay be present as the metal itself or as a catalytically suitable compound of the metal. Among the suitable methods is impregnation of the support with a solution of a compound of the metal, followed by suitable treatment, for example heating and/or reduction, to convert the metal compound to a suitable catalytic form.

According to a further aspect of the present invention a process for converting a hydrocarbon feedstock comprises contacting the feedstock in the presence of hydrogen and at hydrocarbon conversion conditions with a catalyst comprising at least one metal supported on a porous gel support as hereinbefore defined.

The hydrocarbon conversion process of this invention includes for example reforming, hydroisomerisation, dehydrocyclisation, dehydrogenation, hydrogenation, hydrocracking, hydrodesulphurisation, selective hydrogenation for example of acetylene in ethylene.

The amount of metal used in the catalyst will depend to some extent on the hydrocarbon conversion being carried out and to some extent on the metal being used. However in most cases the amount of metal is likely to lie in the range 0.1 to 5% by weight of the total catalyst, more preferably in the range 0.1 to 2% by weight, although in some cases, for example when non-noble metals are used, larger amounts even up to say 20% by weight may be suitable.

A preferred embodiment of this aspect of the present invention is a hydrocarbon reforming process. The conditions used in this embodiment will depend on the feedstock used. The feedstock is preferably a light hydrocarbon oil for example a naphtha fraction. As hereinbefore mentioned, it is preferred that the catalyst should comprise a support according to this invention and a Group VIII metal, preferably platinum, either alone or with one or more additional metals, for example rhenium or iridium. The temperature in the reforming process will generally be in the range 300° to 600° C. more preferably in the range 450° to 540° C. Suitably, the feedstock may contain a small amount, say 0.2 to 2 ppm wt of chloride and if desired water may be added to the feedstock in sufficient quantity to maintain a level of water in the feestock in the range 1 to 10 ppm wt and in the recycle gas stream in the range 10 to 30 ppm vol. The pressure in the reaction zone may be atmospheric or super-atmospheric, preferably lying in the range 25 to 100 psig, more preferably in the range 50 to 400 psig. The particular relationship of temperature and pressure, together with the liquid hourly space velocity, is chosen depending on the nature of the reforming reaction required. In general, however, the liquid hourly space velocity will lie in the range 0.1 to 10. The reforming reaction is effected in the presence of hydrogen and a suitable molar ratio of hydrogen to hydrocarbon feed lies in the range 0.1:1 to 10:1.

The process of the invention is illustrated in the following Example.

EXAMPLE

The reforming of a naphtha feedstock was investigated using three catalysts (Catalysts A, B and C) each comprising platinum on a porous gel support according to this invention, a catalyst (Catalyst D) comprising platinum and rhenium on a porous gel support according to this invention and a conventional, commercially available catalyst (catalyst E).

The supports for catalysts A, B, C and D were prepared by intimately mixing two components (X and Y) in differing proportions, each component being made from flame hydrolysed alumina particles. The resultant mixtures were made into sols, converted to gels and finally calcined at 600° C.

The physical characteristics of components X and Y and of the supports for catalysts A, B and C are summarised in Table 1.

TABLE 1

| Support | Proportion of Component X wt % | Proportion of Component Y wt % | Surface Area (m²/g) | Pore Volume (ml/g) | Mean Pore Diameter (Å) | Pore size Range for 80% of Pore Volume (Å) |
| --- | --- | --- | --- | --- | --- | --- |
| X | 100 | 0 | 116 | 0.71 | 230 | 70 |
| Y | 0 | 100 | 165 | 0.55 | 120 | 60 |
| A | 83 | 17 | 132 | 0.55 | 180 | 76 |
| B | 75 | 25 | 136 | 0.51 | 160 | 70 |

TABLE 1-continued

| Support | Proportion of Component X wt % | Proportion of Component Y wt % | Surface Area (m²/g) | Pore Volume (ml/g) | Mean Pore Diameter (Å) | Pore size Range for 80% of Pore Volume (Å) |
|---|---|---|---|---|---|---|
| C | 25 | 75 | 164 | 0.38 | 90 | 60 |

Notes:
(a) Surface area was measured by $N_2$ adsorption after outgassing at 110° C. for 6 hours.
(b) Pore volumes were calculated from measurements of the difference in reciprocal particle and true densities.
(c) Pore size distributions were determined by mercury porosimetry up to 40,000 psig.

Catalysts A, B and C were prepared by first leaching away sodium from the calcined gel in nitric acid to ≦30 ppm, then impregnating the support with a similar volume of chloroplatinic acid for 4 hours. The products were then dried at 100° C. for 5 hours, calcined at 440° to 570° C., chlorided at 500° C. in an air/hydrogen chloride stream and finally reduced in flowing hydrogen at 500° C. for 3 hours.

Catalyst D was prepared by impregnating support B (after leaching away sodium) with a similar volume of chloroplatinic acid and perrhenic acid and in concentrations designed to provide 0.3 wt% each of platinum and rhenium in the final catalyst. The catalyst was dried at 60° C. for 2 hours, 110° C. for 2 hours, calcined at 560° C. in an air stream containing hydrogen chloride, and finally reduced and sulphided in a hydrogen stream containing dimethylsulphide.

Catalysts A, B, C and E each of which contained 0.2 to 0.4 wt% platinum, and catalyst D were tested for naphtha reforming activity in a small once-through laboratory reactor using a $C_6$–$C_9$ heart cut naphtha whose composition was (in wt%):

Aromatics: Benzene, 0.9; Toluene, 3.8; Ethylbenzene, 1.1; m- and p-xylene, 3.3; o-xylene, 1.2; $C_{9+}$ aromatics, 1.3.

Paraffins: $C_6$ iso, 5.1; normal, 6.8; $C_7$ iso, 8.7; normal, 9.9; $C_8$ iso, 10.2; normal, 8.9; $C_9$ iso, 6.8; normal, 2.7.

Naphthenes: $C_5$, 0.2; $C_6$, 4.7; $C_7$, 9.3; $C_8$, 9.4; $C_9$, 5.6.

Tests were carried out in yield and selectivity under the following conditions:
temperature range 480° to 510° C.
WHVS 2.5 hr$^{-1}$
Molar ratio $H_2$/hydrocarbon feed 6:1
Pressure 300 psig
$H_2O$/Cl weight ratio in feed 10:1

Table 2 summarises the results obtained after 60 hours operation.

TABLE 2

| Catalyst | $C_6$ to $C_9$ Aromatics | 100 - $C_5^+$ reformate (wt % on feed) |
|---|---|---|
| A | 40.0 | 9.8 |
| A | 41.2 | 10.9 |
| A* | 40.9 | 7.2 |
| B | 38.6 | 9.6 |
| D | 40.4 | 9.5 |
| C | 41.9 | 13.9 |
| E | 41.0 | 13.3 |
| E | 40.1 | 13.4 |
| E | 40.6 | 13.7 |

*This catalyst contained 0.1% by weight yttria. None of the other catalysts contained yttria.

The results indicate that catalyst A, B, C and D are as active as commercial catalyst E in the production of aromatics but catalysts A, B and D are much less active in hydrocracking to gaseous $C_5^-$ products. Hence they produce more useful reformate. The presence of yttria (see catalyst A*) enhances this effect.

Catalyst C has a higher surface area and much lower mean pore diameter than catalysts A, B and D. It can be seen that its performance is similar to that of catalyst E. The Applicants believe that this difference may be associated with differences in the pore size distribution range of the various catalysts, in particular with the rather narrow distribution of the larger pores of catalysts A, B and D.

We claim:

1. A process for reforming a hydrocarbon reforming feedstock containing at least one hydrocarbon, which process comprises contacting the feedstock in the presence of hydrogen at a temperature of at least 300° C., at atmospheric or super-atmospheric pressure and at a liquid hourly space velocity of at least 0.1 with a catalyst comprising at least one metal supported on a porous gel support which comprises a porous gel of an inorganic substance, the porous gel having been prepared by a "sol-gel" process, and in which the gel has a surface area in th range 125 to 150 m²/g, and a mean pore diameter in the range 140 to 190 Angstroms with at least 80% of the pore volume contained in pores having a pore diameter size distribution in the range of 50 to 90 Angstroms.

2. A process as claimed in claim 1 in which the catalyst comprises a Group VIII metal or metal compound supported on a porous gel support.

3. A process as claimed in claim 2 in which the Group VIII metal is platinum.

4. A process as claimed in claim 2 in which the catalyst comprises platinum and rhenium supported on a porous gel support.

5. A process as claimed in claim 1 in which the amount of metal used in the catalyst is in the range of from 0.1 to 5% by weight of the total catalyst.

6. A process as claimed in claim 5 in which the amount of metal is in the range of 0.1 to 2% by weight.

7. A process as claimed in claim 1 in which the reforming is conducted at a temperature in the range of 300° to 600° C.

8. A process as claimed in claim 1 in which the reforming is conducted at a liquid hourly space velocity in the range of 0.1 to 10.

* * * * *